United States Patent
Arslan et al.

(10) Patent No.: US 9,813,944 B2
(45) Date of Patent: Nov. 7, 2017

(54) SYSTEM AND METHOD FOR DYNAMIC PROVISIONING OF WI-FI CAPACITY IN LARGE VENUES USING C-RAN ARCHITECTURE

(71) Applicant: NEC Laboratories America, Inc., Princeton, NJ (US)

(72) Inventors: Mustafa Arslan, Princeton, NJ (US); Karthikeyan Sundaresan, Manalapan, NJ (US); Ramanujan Sheshadri, Buffalo, NY (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/385,173

(22) Filed: Dec. 20, 2016

(65) Prior Publication Data

US 2017/0265104 A1     Sep. 14, 2017

Related U.S. Application Data

(60) Provisional application No. 62/307,757, filed on Mar. 14, 2016.

(51) Int. Cl.
| | |
|---|---|
| *H04W 28/16* | (2009.01) |
| *H04W 24/02* | (2009.01) |
| *H04W 84/12* | (2009.01) |
| *H04W 88/08* | (2009.01) |

(52) U.S. Cl.
CPC ........... *H04W 28/16* (2013.01); *H04W 24/02* (2013.01); *H04W 84/12* (2013.01); *H04W 88/085* (2013.01)

(58) Field of Classification Search
CPC ........... H04Q 11/0062; H04Q 11/0067; H04Q 2011/0086; H04B 10/2503; H04W 24/10; H04W 72/085; H04W 88/08; H04L 5/0057
See application file for complete search history.

(56) References Cited

U.S. PATENT DOCUMENTS

| | | | |
|---|---|---|---|
| 6,434,164 B1 * | 8/2002 | Matsunaga | H04H 20/78 348/E7.07 |
| 2014/0031049 A1 * | 1/2014 | Sundaresan | H04W 16/02 455/447 |
| 2014/0177840 A1 * | 6/2014 | Liu | H04W 28/08 380/270 |

(Continued)

OTHER PUBLICATIONS

N. Ahmed et al., "SMARTA: A Self-Managing Architecture for Thin Access Points", CoNext '06 held Dec. 4-7, 2006, Lisbon, Portugal. pp. 1-12.

(Continued)

*Primary Examiner* — Nizar Sivji
(74) *Attorney, Agent, or Firm* — Jospeh Kolodka

(57) ABSTRACT

A computer-implemented method for dynamic provisioning of Wi-Fi capacity in areas using a centralized radio access network (C-RAN) architecture is presented. The computer-implemented method includes introducing a set of access points (APs) in a network for providing capacity required to serve a plurality of users accessing heterogeneous content, introducing a set of remote radio heads (RRHs) in the network acting as transmit/receive points, tracking traffic fluctuations, and adapting front-haul configurations at a granularity of epochs, where measurements from previous epochs serve as input to drive current epochs.

20 Claims, 9 Drawing Sheets

(a) System Architecture      (b) Testbed

(56) References Cited

U.S. PATENT DOCUMENTS

| | | | |
|---|---|---|---|
| 2016/0192225 A1* | 6/2016 | Ko | H04L 5/0028 370/252 |
| 2016/0261935 A1* | 9/2016 | Bang | H04B 10/2503 |
| 2016/0366623 A1* | 12/2016 | Senarath | H04W 36/0072 |

OTHER PUBLICATIONS

Paramvir Bahl et al., "Cell Breathing in Wireless LANS: Algorithms and Evaluation", IEEE Transactions on Mobile Computing, vol. 6, No. 2. Feb. 2007. pp. 1-15.

Ioannis Broustis et al., "MDG: Measurement-Driven Guidelines for 802.11 WLAN Design", MobiCom '07 held Sep. 9-14, 2007, Montreal, Quebec, Canada. pp. 1-12.

Ranveer Chandra et al., "DirCast: A Practical and Efficient Wi-Fi Multicast System", ICNP Conference 2009 held Oct. 13-16, 2009, Princeton, New Jersey. pp. 1-10.

Gee-Kung Chang et al., "Architecture and Applications of a Versatile Small-Cell, Multi-Service Cloud Radio Access Network Using Radio-over-Fiber Technologies", IEEE International Conference on Communications 2013: IEEE ICC 2013—Workshop on Optical-Wireless Integrated Technology for Systems and Networks 2013 held Jun. 9-13, 2013, Budapest, Hungary. pp. 879-883.

B. Charbonnier et al., "Upcoming perspectives and future challenges for ROF", IEEE Xplore Conference: Microwave Photonics, 2007 IEEE International Topical Meeting held Oct. 2-5, 2007, Victoria, BC, Canada. pp. 21-23.

Yu-Chung Cheng et al., "Automating Cross-Layer Diagnosis of Enterprise Wireless Networks", SIGCOMM 2007 held Aug. 27-31, 2007, Kyoto, Japan. pp. 1-12.

Yu-Chung Cheng et al., "Jigsaw: Solving the Puzzle of Enterprise 802.11 Analysis", SIGCOMM 2006 held Sep. 11-15, 2006, Pisa, Italy. pp. 1-12.

Sebastien Deronne et al.,"WiFi Transmission of Radio-over-Fiber Systems: Performance of the IEEE 802.11n Aggregation Mechanism", ONDM 2013—17h International Conference on Optical Network Design and Modeling held Apr. 16-19, 2013, Brest, France. pp. 167-172.

Varun Gupta et al., "Experimental Evaluation of Large Scale WiFi Multicast Rate Control", IEEE INFOCOM 2016 held Apr. 10-15, 2016, San Francisco, California. pp. 1-12.

Navid Hamedazimi et al., "FireFly: A Reconfigurable Wireless Data Center Fabric Using Free-Space Optics", SIGCOMM 2014 held Aug. 17-22, 2014, Chicago, Illinois. pp. 1-12.

Cheng Liu et al., "The Case for Re-configurable Backhaul in Cloud-RAN based Small Cell Networks", IEEE INFOCOM 2013 held Apr. 14-19, 2013, Turin, Italy. pp. 1124-1132.

He Liu et al., "Scheduling Techniques for Hybrid Circuit/Packet Networks", CoNEXT 2015 held Dec. 1-4, 2015, Heidelberg, Germany. pp. 1-13.

Rohan Murty et al., "Designing High Performance Enterprise Wi-Fi Networks", NSDI 2008: 5th USENIX Symposium on Networked Systems Design and Implementation held Apr. 16-18, 2008, San Francisco, California. pp. 1-16.

Michael Sauer et al., "Radio Over Fiber for Picocellular Network Architectures", Journal of Lightwave Technology, vol. 25, No. 11, Nov. 2007. pp. 3301-3320.

Julius Schulz-Zander et al., "Programmatic Orchestration of WiFi Networks", USENIX ATC 2014 Annual Technical conference held Jun. 19-20, 2014, Philadelphia, Pennsylvania. pp. 1-13.

Sayandeep Sen et al., "Scalable WiFi Media Delivery through Adaptive Broadcasts", NSDI 2010—7th USENIX conference on Networked systems design and implementation held Apr. 28-30, 2010, San Jose, California. pp. 1-14.

Xi Shen et al., "Optimized Indoor Wireless Propagation Model in WiFi-RoF Network Architecture for RSS-Based Localization in the Internet of Things", Microwave Photonics, 2011 International Topical Meeting on & Microwave Photonics Conference 2011 held Oct. 18-21, 2011, Singapore. pp. 274-277.

Vivek Shrivastava et al., "PIE in the Sky: Online Passive Interference Estimation for Enterprise WLANs", NSDI 2011-8th USENIX conference on Networked systems design and implementation held Mar. 30-Apr. 1, 2011, Boston Massachusetts. pp. 1-14.

Karthikeyan Sundaresan et al., "FluidNet: A flexible Cloud-Based Radio Access Network for Small Cells", IEEE/ACM Transactions on Networking, vol. 24, No. 2, Apr. 2016. pp. 915-928.

Arunchandar Vasan et al., "ECHOS—Enhanced Capacity 802.11 Hotspots", IEEE INFOCOM 2005—IEEE Conference on Computer Communications held Mar. 13-18, 2005, Miami, Florida. pp. 1-11.

S. Vasudevan et al., "Facilitating Access Point Selection in IEEE 802.11 Wireless Networks", IMC 2005—5th ACM SIGCOMM conference on Internet Measurement held Oct. 19-21, 2005, Berkeley, California. pp. 293-298.

Yiannis Yiakoumis et al., "BeHop: A Testbed for Dense WiFi Networks", WiNTECH 2014—9th ACM international workshop on Wireless network testbeds, experimental evaluation and characterization held Sep. 7-11, 2014, Maui, Hawaii. pp. 1-8.

\* cited by examiner

SYSTEM AND METHOD FOR DYNAMIC PROVISIONING OF WI-FI CAPACITY IN LARGE VENUES USING C-RAN ARCHITECTURE

RELATED APPLICATION INFORMATION

This application claims priority to Provisional Application No. 62/307,757, filed on Mar. 14, 2016, incorporated herein by reference in its entirety.

BACKGROUND

Technical Field

The present invention relates to Wi-Fi networks and, more particularly, to a system and method for dynamic provisioning of Wi-Fi capacity in large venues using a centralized radio access network architecture.

Description of the Related Art

In recent years, Wi-Fi has grown both in its deployment footprint and in the convenience it provides to users around the world. However, despite all the technological advances such as beamforming and MIMO (multiple input multiple output), Wi-Fi experience is still far from ideal in high-density venues such as conference/event centers, stadiums, airports etc., where thousands of users demand service at once. The root cause of this issue is the disconnect between fixed Wi-Fi provisioning (where the capacity is allocated a priori) and the high spatiotemporal traffic variation characteristically found in such large venues.

SUMMARY

A computer-implemented method for dynamic provisioning of Wi-Fi capacity in areas using a centralized radio access network (C-RAN) architecture is presented. The method includes introducing a set of access points (APs) in a network for providing capacity required to serve a plurality of users accessing heterogeneous content, introducing a set of remote radio heads (RRHs) in the network acting as transmit/receive points, tracking traffic fluctuations, and adapting front-haul configurations at a granularity of epochs, where measurements from previous epochs serve as input to drive current epochs.

A system for dynamic provisioning of Wi-Fi capacity in areas using a centralized radio access network (C-RAN) architecture is presented. The system includes a memory and a processor in communication with the memory, wherein the processor is configured to introduce a set of access points (APs) in a network for providing capacity required to serve a plurality of users accessing heterogeneous content, introduce a set of remote radio heads (RRHs) in the network acting as transmit/receive points, track traffic fluctuations, and adapt front-haul configurations at a granularity of epochs, where measurements from previous epochs serve as input to drive current epochs.

A non-transitory computer-readable storage medium comprising a computer-readable program for dynamic provisioning of Wi-Fi capacity in areas using a centralized radio access network (C-RAN) architecture is presented, wherein the computer-readable program when executed on a computer causes the computer to perform the steps of introducing a set of access points (APs) in a network for providing capacity required to serve a plurality of users accessing heterogeneous content, introducing a set of remote radio heads (RRHs) in the network acting as transmit/receive points, tracking traffic fluctuations, and adapting front-haul configurations at a granularity of epochs, where measurements from previous epochs serve as input to drive current epochs.

In another aspect, the method, system, and non-transitory computer-readable storage medium further include adapting the front-haul configurations to serve user traffic demands in terms of capacity and requests for accessing the heterogeneous content, such as unicast and broadcast content. In yet another aspect, the method, system, and non-transitory computer-readable storage medium further include optimizing the front-haul configurations to serve users of the plurality of users requesting the unicast and broadcast content simultaneously.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Current WLANs (wireless or Wi-Fi local area networks) in high-density venues are planned based on estimated per-user bandwidth requirements. Once an aggregate throughput requirement is determined for a particular area, the next step is to decide on the number of APs (access points) to provide the required capacity and assign channels to address inter-AP interference. The traffic demand is then distributed across the APs that serve the given area (i.e., load balancing).

When a traffic surge goes beyond the planned capacity allocation, Wi-Fi performance quickly deteriorates since it is virtually impossible to provide additional capacity in a reasonable time. To guarantee reliable network-wide performance, venue owners are often forced to over-provision their WLANs based on worst-case traffic estimations, leading to increased equipment and maintenance costs. In short, there is no efficient way for WLANs to adapt to changing traffic patterns other than manually deploying more APs (which is impractical) or worst-case provisioning (which is expensive).

The core idea in a C-RAN (centralized radio access network) is to decouple radio frequency transmissions from baseband processing. This allows for multiple light-weight remote radio heads (RRHs) to be deployed for RF (radio frequency) transmission, while the baseband processing is handled in a central processing cluster (i.e., a data center). The C-RAN refers to baseband units that can be virtualized, as well as run on hardware (i.e., not virtualized).

Figure 1:
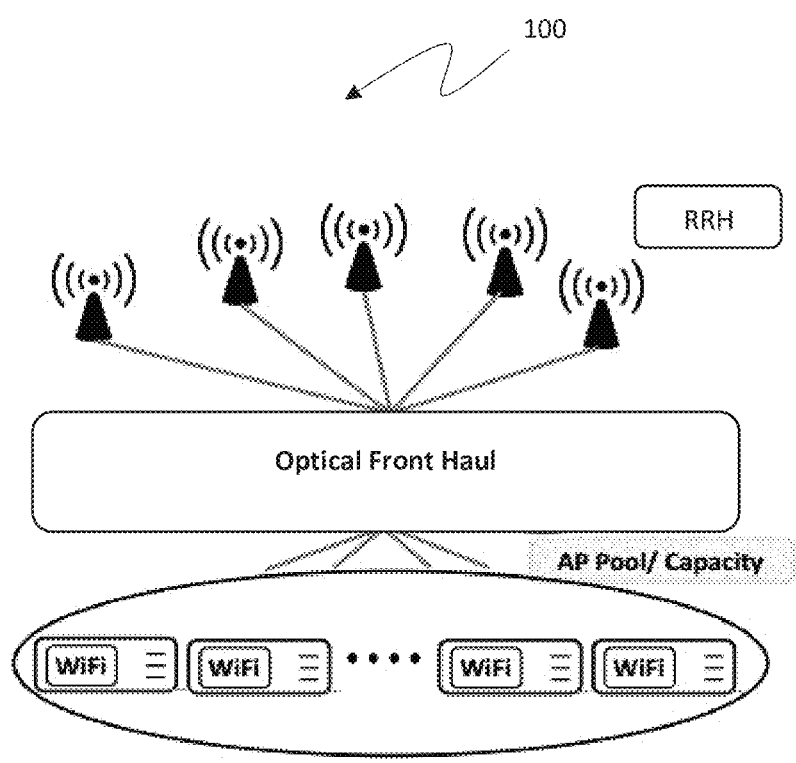
FIG. 1 is an example C-RAN (centralized radio access network) architecture.

The RRHs and the processing cluster is connected via a low-delay optical fiber network called the C-RAN front-haul 100 (FIG. 1). The front-haul is the component that defines how the baseband processing units (BPUs) are mapped to RRHs, thus defining the capacity distribution across the network. The C-RAN could be, for example, a distributed antenna system (DAS).

A given RRH supports simultaneous mappings from multiple BPUs. In a C-RAN-based WLAN, this would mean that multiple APs (acting as BPUs) can be mapped to the same RRH albeit on orthogonal channels. Note that since the C-RAN decouples an AP's capacity from its actual physical location, any AP can be mapped to any set of RRHs (not possible in a traditional WLAN). Thus, the C-RAN architecture allows dynamic repurposing of capacity through appropriate re-configuration of the front-haul, thereby obviating the need for worst-case provisioning.

Unlike a cellular network where each base station and user can communicate on multiple channels concurrently (i.e., carrier aggregation), this is not possible with Wi-Fi clients. Even if the latest Wi-Fi clients support channel bonding up to 160 MHz in the 5 GHz band with 802.11ac APs, the legacy ones (11a/b/g/n clients) support 40 MHz bandwidth at most. Thus, legacy clients limit the effective bandwidth of the AP and create a performance bottleneck, warranting the deployment of as many APs as needed to use up all the orthogonal channels in the band (i.e., worst-case provisioning). C-RAN makes it possible to add radio resources (on different channels) to a RRH on the fly (avoiding over-provisioning), allowing to borrow capacity from under-utilized areas of the network and use it to address the traffic surge where needed.

While adopting the C-RAN model in WLANs is a welcome step, the key challenge is orchestrating the C-RAN front-haul in real time to track and adapt to the spatiotemporal traffic fluctuations, so as to maximize the traffic demand that can be supported. Further, with the increasing importance of wide-area broadcast applications (e.g., live sports replays), the orchestration should take into account unicast as well as broadcast traffic demands. While LTE (long term evolution) has built-in mechanisms to handle wide-area broadcast, Wi-Fi handles broadcast only at the cell level where each AP independently broadcasts the same content to its clients and contends for medium access like it would for unicast traffic. If orchestrated properly, the front-haul has the potential to bring efficient wide-area broadcast support to WLANs. However, it is difficult to optimally satisfy both unicast and broadcast demands since each benefits from different front-haul configurations.

In one aspect, the method, system, and non-transitory computer-readable storage medium further include adapting the front-haul configurations to serve user traffic demands in terms of capacity and requests for accessing the heterogeneous content, such as unicast and broadcast content. In another aspect, the method, system, and non-transitory computer-readable storage medium further include optimizing the front-haul configurations to serve users of the plurality of users requesting the unicast and broadcast content simultaneously.

The exemplary embodiments introduce AmorFi ("Amorphous WiFi") a first-of-its-kind C-RAN-based WLAN that adapts its network configurations on the fly to cater to changing traffic demands (both unicast and broadcast). AmorFi realizes this through software-defined access (SDA), wherein it orchestrates the C-RAN front-haul, to effect different cell configurations in real time. In designing AmorFi, the exemplary embodiments leverage the full potential of the C-RAN architecture for Wi-Fi to make the following key contributions.

In one example, designing algorithms to determine the optimal front-haul configurations is described. Interference across Wi-Fi APs (cells) is managed through CSMA (carrier sense multiple access) and channel assignment. The latter is a hard problem in itself and requires taking into account interference conflicts between APs. The amorphous notion of cells in AmorFi makes this issue even more challenging. Further, an inherent tradeoff is addressed between wide-area coverage (useful for broadcast traffic efficiency) and spatial reuse (useful for unicast throughput) in determining the optimal configuration. AmorFi employs efficient algorithms to address this tradeoff and not only maximizes the amount of unicast and broadcast traffic that can be supported, but also does so in a compute and energy efficient manner, employing a small number of BPUs (basic processing units).

In one example, building and deploying AmorFi in practice is described. This is challenging owing to the SDA capability in AmorFi. SDA requires re-mapping of the signals on the fly from any AP (BPU) to any remote antenna (RRH), with negligible latency. The exemplary embodiments realize this in the analog domain using RF-over-fiber technology and employ an optical switch to apply the desired front-haul configurations in real time. Using a testbed of four APs and six RRHs, AmorFi is evaluated for both unicast and broadcast (video) applications. The results indicate that AmorFi delivers twice the throughput supported by baseline schemes and supports a higher quality broadcast video.

The C-RAN architecture 100 of FIG. 1 consists of the following components:

Processing Cluster: centrally located baseband processing units (BPUs) responsible for signal processing and providing capacity.

Front-haul: an optical fiber network that supports wavelength multiplexing to deliver the signals between the BPUs and remote antennas (RRHs), using either (a) CPRI (Common Public Radio Interface)—an interface standard for transmitting digitized IQ samples, or (b) RF-over-fiber (RoF), where analog RF (radio frequency) is carried over the fiber.

Remote Radio Heads (RRHs): light-weight antennas that convert optical signals to RF on the downlink (and RF to optical for uplink), providing wireless access to users. The front-haul defines how the capacity of the BPUs is distributed across the RRHs. Next, a description is provided for how a software programmable front-haul would help a C-RAN-based WLAN handle various scenarios challenging for traditional WLANs.

With user mobility, the traffic demand shifts across the network, potentially creating overloaded APs as well as leaving some APs to serve no (or few) users. In traditional WLANs, overloaded APs handle the increased demand either with admission control (rejecting some users) or simply provide sub-par performance to their clients. With C-RAN-based WLANs, the capacity of lightly loaded APs can be re-mapped to the overloaded regions to handle the traffic surge in real time. An experiment is conducted in FIG. 2, where a group of users move between two locations. In traditional WLAN, each AP provides around 8 Mbps UDP (user datagram protocol) throughput per user. In contrast, C-RAN-based WLAN avoids overload by mapping both APs to the same RRH (on different channels) and re-distributing the load over the two APs. The result is almost 16 Mbps throughput per user showing that software-defined access (SDA) enabled by the front-haul is essential to successfully handle the traffic surge.

In traditional WLANs, an AP is deployed in one physical location and its coverage area gets defined by its transmit power. Some users may be positioned far from an AP, and, thus, experience low data rates (e.g., in sparse traffic areas with low AP density). With packet-fair scheduling in Wi-Fi, such low rate users adversely impact all other users served by the AP. On the other hand, C-RAN-based WLANs allow mapping the signal of a given AP to more than one RRH simultaneously creating a one (BPU)-to-many (RRH) mapping in the front-haul. Since RRHs are light-weight (in cost and size), they can be deployed with high density. With the help of one-to-many front-haul mapping, each user can then be served through its closest RRH with high data rates.

Figure 3:
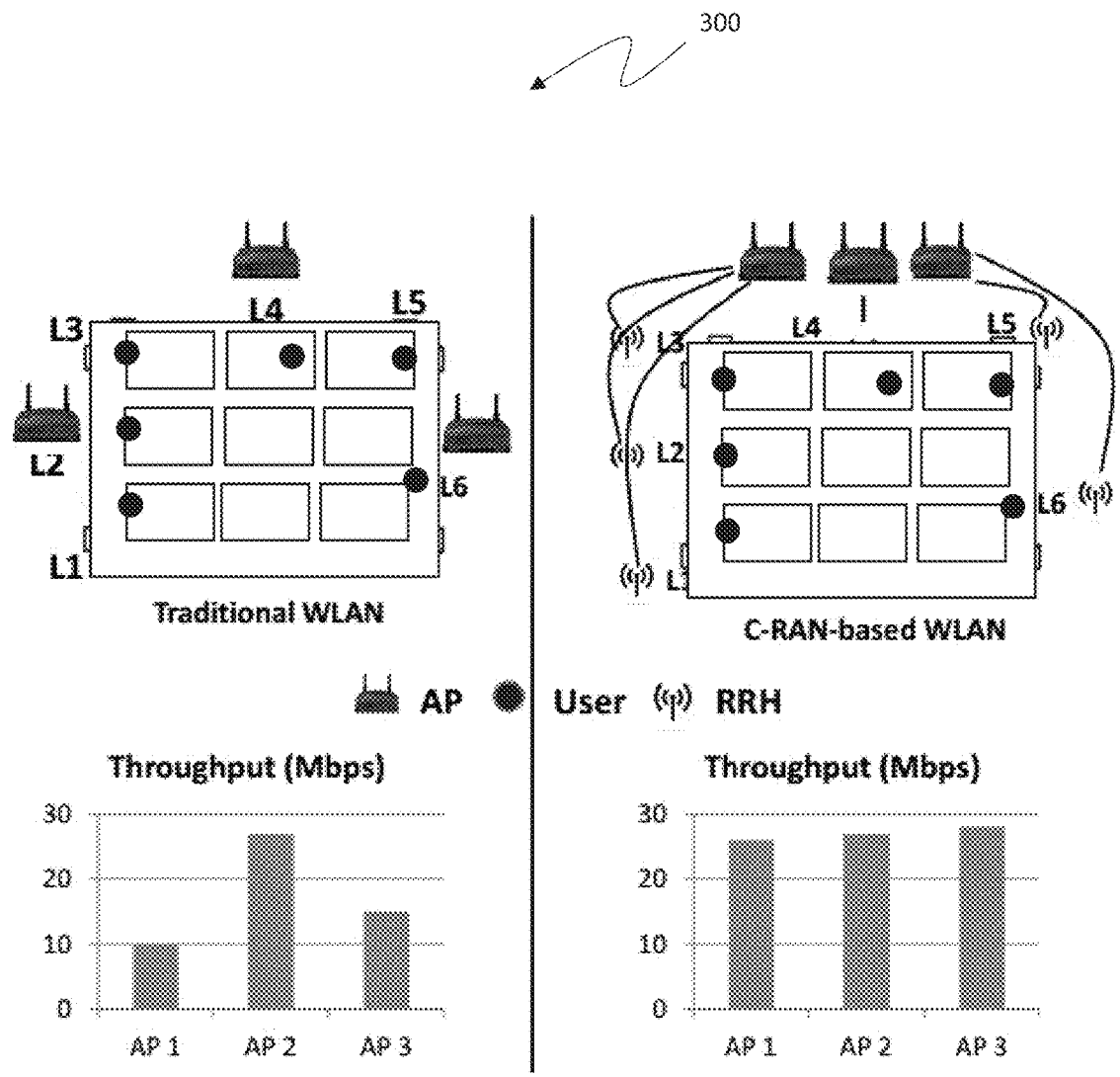
FIG. 3 is a block/flow diagram of adaptable AP (access point) coverage in C-RAN based Wi-Fi, in accordance with embodiments of the present invention.

To evaluate the impact of coverage, in one example, the exemplary embodiments use three (3) APs and six (6) clients, as shown in the system 300 of FIG. 3. There are six candidate locations (L1-L6) to deploy the three APs (FIG. 3). Once a location is chosen for an AP, clients are permitted to associate to their nearest AP and run multiple iperf sessions from each AP to its clients. All possible AP-location combinations are tried and the locations that yield the best throughput for traditional WLAN (L2, L4 and L6) are fixed. For C-RAN-based WLAN, the example embodiments deploy RRHs at all six locations but use the same three APs to drive them (the specific AP-RRH mapping is depicted in FIG. 3). The per-user throughput is significantly better in this case since each user communicates with the AP via its closest RRH (enabled by one-to-many AP-RRH mapping). Note that this is not possible in the traditional WLAN due to limited AP transmit power. Even with the same power limit on each RRH, C-RAN-based WLAN allows for much larger coverage owing to the decoupling of APs from physical locations and the transmit diversity benefit from synchronous RRH transmissions.

Figure 4:
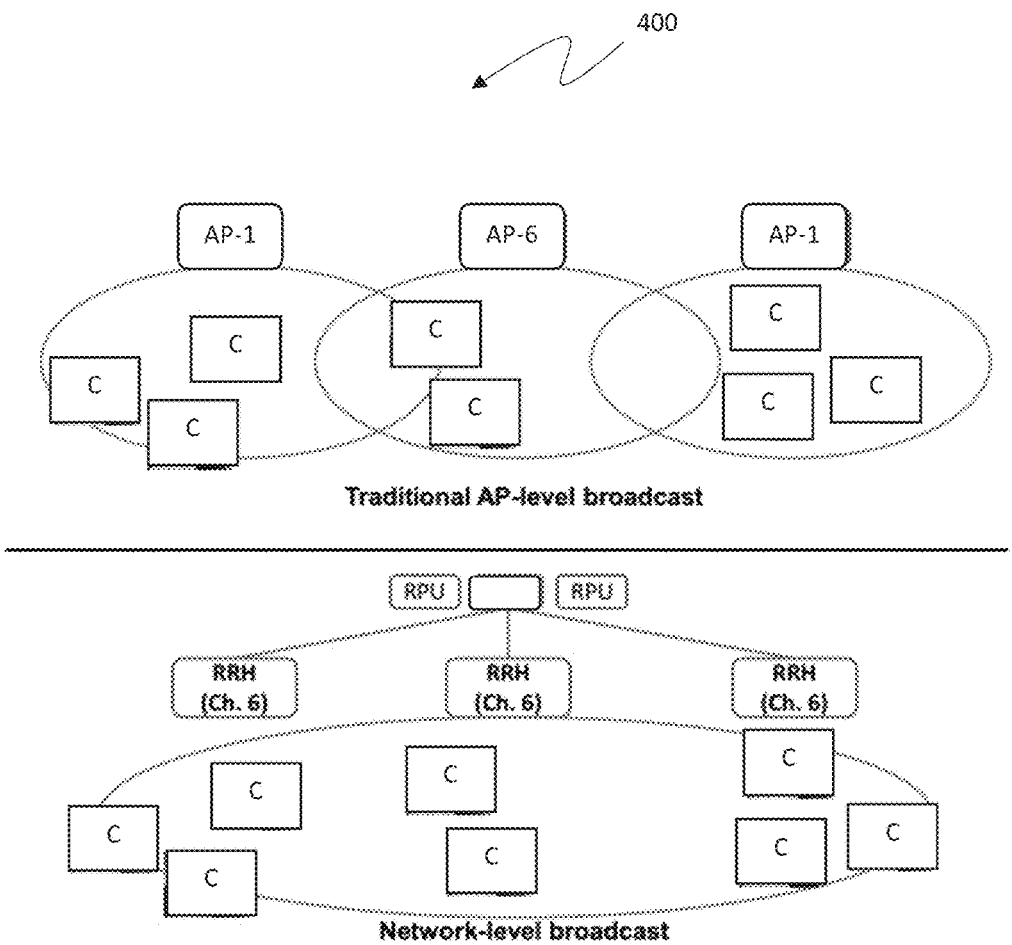
FIG. 4 is a block/flow diagram illustrating a network-wide broadcast in C-RAN based Wi-Fi, in accordance with embodiments of the present invention.

In addition to unicast applications such as e-mail and social media, supporting broadcast applications (e.g., live video) is also important in high-density venues. Broadcasting MAC (media access control) frames is inefficient in traditional WLANs due to the lack of acknowledgments and the use of low bit rates. Even with the advances made by earlier works and the proposals by the IEEE 802.11aa amendment to 802.11, broadcast transmission remains at the AP-level meaning that each AP independently broadcasts data to its clients "C", as shown in the system 400 (FIG. 4).

With AP-level broadcast, APs contend for medium access (similar to what they would do for unicast) even though they are serving the same content. On the other hand, one-to-many mapping in the C-RAN front-haul enables what is referred to as network-level broadcast where an AP broadcasts content over a wide area (FIG. 4). This leads to better transmission efficiency for broadcast than traditional WLAN, freeing up the remaining APs to serve other applications. It is noted that LTE already has built-in support for network-wide broadcast where base stations use a synchronization protocol to jointly transmit the broadcast content. Thus, the notion of one-to-many front-haul mappings is not as critical in cellular C-RANs as it is for C-RAN-based WLANs, where the latter benefits from synchronization in the optical domain overcoming the lack of an existing protocol.

The true advantage of the C-RAN architecture in WLANs is to orchestrate the front-haul in a software-defined manner to tailor capacity allocations subject to prevailing traffic demands in real time. The spatiotemporal traffic variations requires constant tracking of the load and choosing the appropriate front-haul configuration. With dynamic front-haul configurations, the interference dependencies between APs change, making channel assignment and load balancing a much harder task than it is for statically-planned WLANs. Thus, even when the WLAN supports unicast traffic alone, it is challenging to come up with the optimal front-haul mapping that supports as much of the demand as possible.

Figure 2:
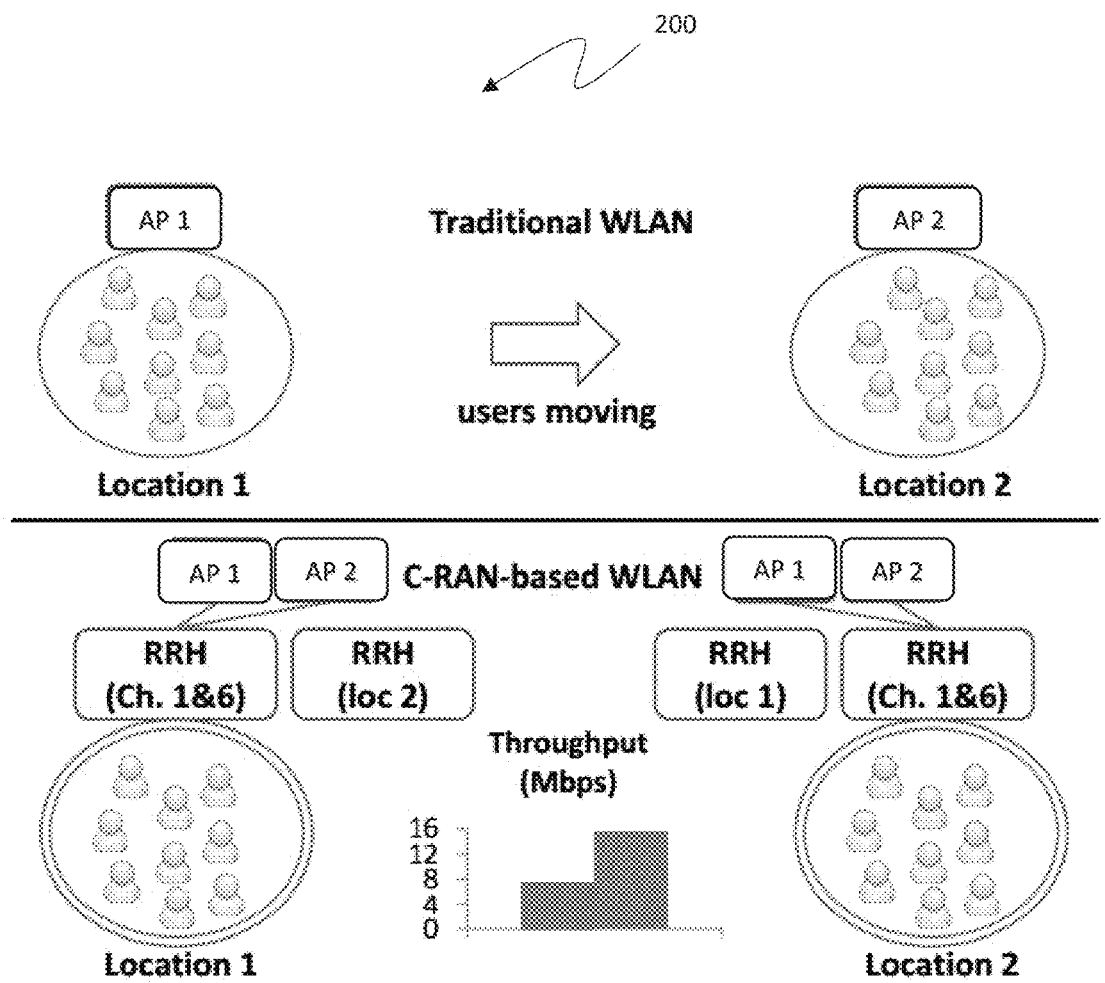
FIG. 2 is a block/flow diagram illustrating repurposing capacity in C-RAN-based WLANs (Wi-Fi local area networks), in accordance with embodiments of the present invention.

When a WLAN supports a mix of unicast and broadcast applications, it makes it even harder since each application type creates conflicting requirements on the type of front-haul mapping that needs to be adopted. With one-to-one mapping, each AP gets mapped to one RRH, thus creating smaller cells. This emphasizes spatial reuse, which increases the network capacity to support unicast applications, as shown in the system 200 (FIG. 2). In contrast, one-to-many mapping creates larger cells (decreasing spatial reuse), which is important to efficiently deliver the same broadcast content over a wide-area, as shown in system 400 (FIG. 4). The issue is exacerbated by the clients not being able to seamlessly access multiple Wi-Fi channels (unlike LTE), thereby requiring both unicast and broadcast applications to be delivered on the same channel (AP).

To summarize, the key challenge in C-RAN-based WLANs is to discover the optimal front-haul configuration that caters to both unicast and broadcast applications and adapt the configuration based on spatiotemporal changes in traffic demand. In doing so, one also has to manage interference conflicts across cells, which becomes harder since the cell patterns themselves keep changing as determined by the front-haul.

The exemplary embodiments introduce C-RAN-based WLANs. There are some cellular C-RAN studies that advocate software-programmable front-haul, but they are not directly applicable to Wi-Fi because of the following reasons.

First, while Wi-Fi channel bonding may aggregate capacity to some extent, it is limited due to the presence of legacy clients and CSMA requiring orthogonal channels between neighboring APs. Thus, it is essential to map multiple APs on to the same RRH to increase capacity and carefully assign channels to them to avoid co-channel interference. In contrast, cellular base stations and clients have access to all the channels in the spectrum; a base station can handle the traffic surge by increasing its bandwidth as needed (i.e., not needing channel assignment).

Second, the lack of network wide broadcast support in Wi-Fi makes one-to-many front-haul mapping more critical than it is for cellular. Thus, one has to balance between supporting unicast and broadcast traffic in C-RAN-based WLANs since each requires different front-haul mappings.

The example network model of the present invention is a C-RAN-based WLAN where $\mathbb{A}$ and $\mathbb{R}$ denote the set of APs (BPUs) and RRHs, respectively. While RRHs act as transmit/receive points, APs provide the capacity required for serving the users. AmorFi is envisioned to track traffic fluctuations and adapt its front-haul configurations (AP-RRH mappings) at the granularity of epochs (minutes), where measurements from previous epochs serve as input to drive the optimization for the current epoch. Hence, each RRH r∈$\mathbb{R}$ poses (requires) a traffic demand $T_r$ for the current epoch (based on weighted average of demands from previous epochs), which is an estimate of aggregate throughput requirements for all users accessing the network through RRH r. The function $f: \mathbb{A} \to \mathbb{R}$ allows each AP to be mapped to zero or more RRHs; the former denotes an idle AP (not providing service), while the latter defines a cluster (contiguous set) i of RRHs $R(i) \in \mathbb{R}$, sharing the capacity P of the corresponding AP. P is estimated based on the aggregate throughputs delivered by the each of the RRHs in R(i) from the previous epoch. When a cluster i is mapped to an AP, it is also assigned a channel k∈$\mathbb{K}$, where $\mathbb{K}$ is the set of channels in the Wi-Fi spectrum. $X_{ik}=1$ captures this assignment (see Table 1 for a complete set of notations).

TABLE 1

Notations used in our problem

| Symbol | Type | Description |
|---|---|---|
| $\mathbb{A}$ | Input | The set of APs |
| $\mathbb{R}$ | Input | The set of RRHs |
| $\mathbb{K}$ | Input | The set of channels |
| $T_r$ | Input | Traffic demand of RRH r |
| P | Input | Channel capacity of an AP (cluster) |
| $\mathbb{N}$ | Output | The set of clusters |
| $X_{ik}$ | Output | Binary variable denoting the assignment of channel k to cluster i ∈ $\mathbb{N}$ |
| $Int(i_1, i_2)$ | Output | Binary variable denoting that clusters $i_1$ and $i_2$ interfere with each other |
| S(r) | Output | The set clusters with include RRH r |
| R(i) | Output | The set of RRHs contained in cluster i |

For a given number of APs (radios) and Wi-Fi channels, AmorFi aims to leverage the C-RAN effectively to maximize the amount of traffic demand (unicast) that can be satisfied at each of the RRHs in the current epoch. Towards capturing this objective, the exemplary embodiments formulate the following optimization problem, (ONC: optimal network configuration) where the goal is to find the network configuration (over the universe $\mathbb{C}$ of all configurations) that maximizes $\lambda \in [0,1]$. The example embodiments define $\lambda$ to be the minimum fraction of traffic demand satisfied across all the RRHs in the network. A network configuration includes the AP-RRH mapping (determining the capacity allocation) and the channel assignment to each of the APs.

$$ONC: \underset{C}{\text{Maximize}}\ \lambda \quad (1)$$

such that:

$$\lambda_r = \min\left\{1, \sum_{i \in S(r)} \sum_{k=1}^{|\mathbb{K}|} \frac{X_{ik} P}{\sum_{l \in R(i)} T_l}\right\} \geq \lambda, \forall r \in \mathbb{R}$$

-continued $$\sum_{i=1}^{|\mathbb{N}|} \sum_{k=1}^{|\mathbb{K}|} X_{ik} \leq |\mathbb{A}| \quad (2)$$

$$\sum_{i \in S(r)} \sum_{k=1}^{|\mathbb{K}|} X_{ik} \geq 1, \forall r \in \mathbb{R} \quad (3)$$

$$X_{i_1 k} + X_{i_2 k} \leq 1, \forall (i_1, i_2) \in S(r), \forall r \in \mathbb{R}, \forall k \in \mathbb{K}, i_1 \neq i_2 \quad (4)$$

$$X_{i_1 k} + X_{i_2 k} \leq 1, \forall (i_1, i_2) \in \mathbb{N}\ \text{s.t}\ Int(i_1, i_2) = 1, \forall k \in \mathbb{K} \quad (5)$$

The first constraint indicates that the fraction of traffic demand satisfied at each RRH r (denoted as $\lambda r$; called traffic satisfaction metric) by taking into account all APs serving it, is greater than $\lambda$. This makes $\lambda$ the minimum such value (that is maximized) across the network. To calculate $\lambda r$, the example embodiments first determine the channel capacity share that RRH r has (out of the cluster capacity P), when it is included in a cluster together with other RRHs. Here, it is assumed that P is shared in proportion to the unicast traffic demand of each RRH in the cluster. The second constraint ensures that the number of clusters generated does not exceed the number of APs ($|\mathbb{A}|$). The third constraint makes sure that all the RRHs (with users to serve) are covered during clustering, and every RRH has an AP assigned. The fourth constraint ensures that all the clusters that share a common RRH, will be assigned different channels. The last constraint ensures that clusters that are in the interference range of each other are not assigned the same channel.

An AP is mapped to a contiguous set of RRHs, i.e., the clustered RRHs form a connected set, where connectivity captures RRHs that are within interference range of each other. The lack of such contiguity creates two drawbacks:

(i) Having an AP serve RRHs that are spread across the network reduces the spatial reuse for that channel. Thus, keeping the RRHs closer helps maximize reuse.

Figure 5:
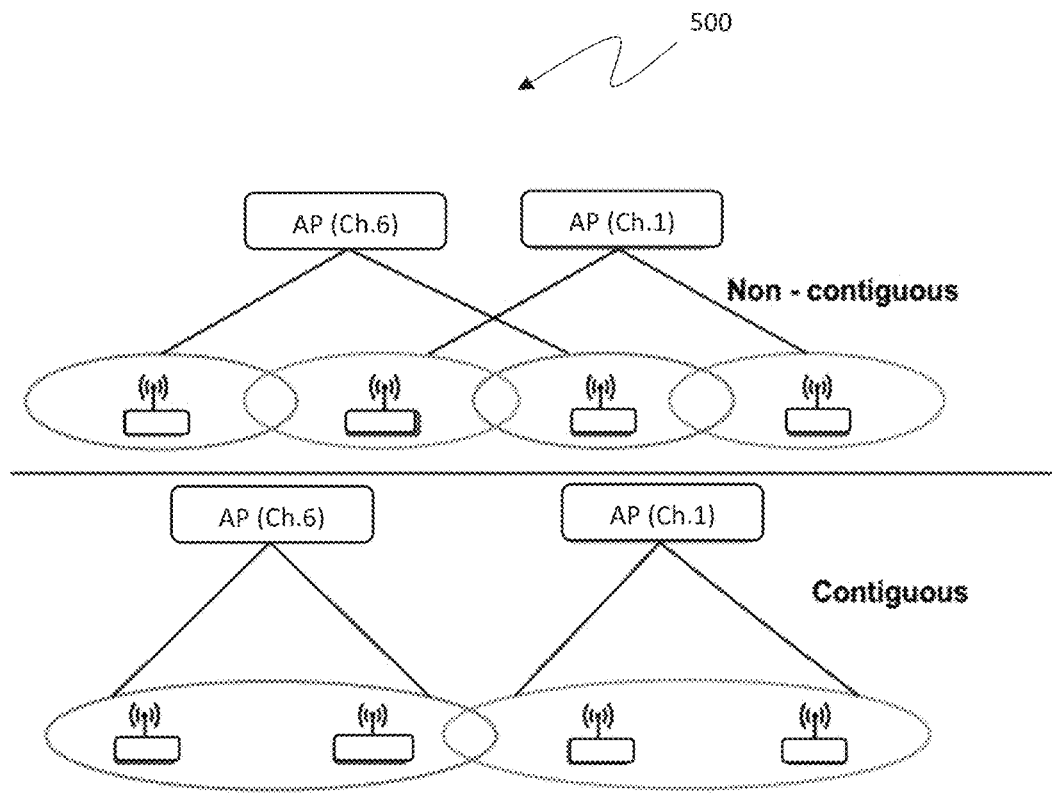
FIG. 5 is a block/flow diagram illustrating non-contiguous vs. contiguous clustering, in accordance with embodiments of the present invention.

(ii) As seen in the comparison 500 of FIG. 5, with non-contiguous clusters, a mobile user experiences frequent handoffs (bad for VOIP and streaming services). On the other hand, a contiguous cluster creates a virtual large cell that reduces such disruptions. With these drawbacks in mind, it is also required that the clusters (R(i)) determined be contiguous.

ONC requires one to solve the problems of contiguous clustering and channel assignment jointly. Since each individual problem is hard in itself, solving them jointly is much more challenging. Hence, the exemplary embodiments are aimed to design efficient, yet simple algorithms to solve ONC with the following intuition.

Two parameters impact the amount of traffic that can be supported: number of radios (APs) and channels. The available radios control the maximum capacity that can be served, and limit the number of RRH clusters that can be formed, while the clustering process itself determines how much of the available capacity is efficiently used (and not wasted) to satisfy the demand. When the available channels are assigned to the clusters, they impact the net traffic demand that can be supported by a cluster based on the sharing of its channel (and hence capacity) with other clusters in its neighborhood. While both clustering and channel assignment impact the net traffic served, their relative contribution to $\lambda$ is biased, where clustering plays a bigger role. The impact of channel assignment varies depending on the number of channels. For example, it has little to no impact in 5 GHz, where many channels (nine) are available, making it easier for a conflict-free channel assignment, compared to 2.4 GHz (three channels), where it has appreciable impact.

Given this biased effect, AmorFi realizes that the additional gains from solving the two problems jointly are not appreciable to justify the associated high complexity. Hence, AmorFi decouples the clustering process from channel assignment and has a two-step approach as follows.

First, it addresses the clustering problem efficiently without accounting for channel assignment (conflicts) between clusters (APs), to maximize the traffic satisfaction ($\lambda$) in the network. Then, given the clustering solution and the available channels in the Wi-Fi spectrum, it assigns channels to clusters to resolve as many of the inter-cluster conflicts and retain as much of the traffic satisfaction from the clustering process ($\hat{\lambda}$, where $\hat{\lambda} \leq \lambda$). While this decoupled approach incurs low complexity, it faces the challenge that the clustering solution that maximizes $\lambda$ in the first step, may not contribute to a final solution (after channel assignment) with the best traffic satisfaction ($\hat{\lambda}$). In other words, a clustering solution with a lesser $\lambda$ (after clustering) could potentially incur a lower loss during the channel assignment step to yield a higher $\hat{\lambda}$.

To address this challenge, AmorFi employs an iterative optimization approach. During the start of each epoch, the aggregate traffic demand of each RRH (based on estimates from previous epochs) is input to the controller. The controller then runs the iterative optimization, where it solves a dual of the problem in each iteration to determine the most efficient network-wide configuration.

Step 1—Initialize: Initialize $\lambda$ with an upper bound ($\lambda_0$) on the traffic demand that can be satisfied at each RRH. This corresponds to a configuration with maximum spatial reuse by allowing each RRH to be served by a separate AP (no clustering needed).

Step 2—Cluster: In each iteration i, translate the $\lambda$—maximization problem into its dual version; where given a $\lambda_i$, determine the smallest number of APs (clusters) required to satisfy $\lambda_i$ of the net traffic demand in each of the clusters. Then impose a logical connectivity structure on the network of RRHs using breadth-first-search (BFS). The structure is used to determine the smallest number of contiguous clusters of RRHs (mi) that serve at least $\lambda_i$ of the traffic demand in each cluster.

Step 3—Assign Channels: Given the RRH clusters and the available Wi-Fi channels, determine a feasible channel assignment to resolve conflicts between neighboring (interfering) clusters. Update traffic satisfaction ($\hat{\lambda}$i) to reflect reduction in capacity (due to time sharing) when the same channel is assigned to interfering clusters.

Step 4—Iterate: Decrement $\lambda$ by a small constant $\delta$ (say 0.01) for the next iteration ($\lambda_{i+1} = \lambda_i - \delta$) and repeat steps 2 and 3. Terminate when $\lambda = \delta$.

Step 5—Output Configuration: Determine the network wide configuration corresponding to the highest $\hat{\lambda}$, namely $\max_i\{\hat{\lambda}_i\}$ such that number of APs employed $m_i \leq |\mathbb{A}|$. The total time complexity of the example solution is $O(I(|\mathbb{R}|^2+|\mathbb{A}|^2))$, where I is the total number of iterations, and $O(|R|^2)$ and $O(|A|^2)$ are the complexities of the clustering and channel assignment components in each iteration respectively. Each of these steps is described in detail below.

At the start of an epoch t, the controller obtains traffic statistics from the previous epoch t−1. Specifically, each AP a reports (i) average capacity $P_a$: the average of all the MCSs (Modulation and Coding Scheme) used for transmissions (from RRHs in its cluster) to all its clients; (ii) aggregate traffic demand $T^a(t-1)$: aggregate of the traffic served to all its users per unit time of the epoch t−1; and (iii) number of RRHs $n_a(t-1)$ serving it. For the upcoming epoch t, the controller combines information from all APs to estimate: (i) average capacity P as the average of the capacity seen by all the active APs in the most recent epoch t−1; and (ii) aggregate traffic demand per RRH r, $T_r(t)$ as the exponentially weighted moving average of traffic demand from prior epochs, i.e., $$T_r(t) = \alpha \cdot \sum_{a : r \in R(a)} \frac{T^a(t-1)}{n_a(t-1)} + (1-\alpha).$$

$T_r(t-1)$, where $\alpha = 0.9$ is the filtering coefficient

AmorFi starts by initializing $\lambda$ to the theoretical upper bound calculated as the ratio of total network capacity to the total traffic demand. The total network capacity is the product of the number of APs ($\mathbb{A}$) and the average channel capacity ($\mathbb{P}$), assuming that every AP gets a non-overlapping channel (upper-bound). Thus, $$\lambda_0 = (P * A) \Big/ \left(\sum_{r=1}^{|R|} T_r\right).$$

Since the traffic requirement at an RRH r (i.e., $\lambda_i \cdot T_r$, for iteration i) can be split and served by multiple clusters (APs), the contiguous clustering problem to determine the minimum number of APs can be optimally solved if a Hamiltonian cycle with the RRHs as the vertices (edges denote interfering RRHs) is constructed. Such a cycle would provide the ordering in which the RRHs are traversed to produce the optimal clustering. However, even determining the existence of a Hamiltonian cycle is NP-complete (in general graphs). Hence, AmorFi constructs an alternate ordering by creating a breadth-first search (BFS) tree on the graph of RRHs, rooted at the RRH with the least degree.

Figure 6:
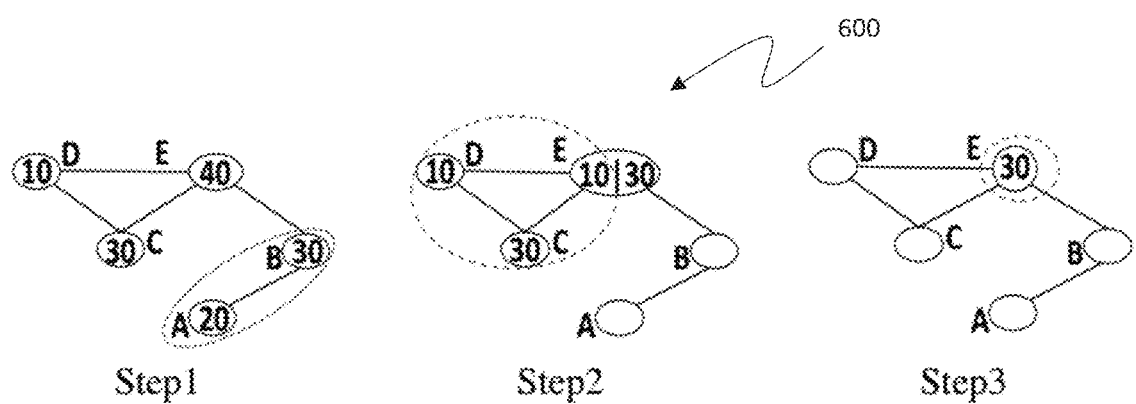
FIG. 6 is a block/flow diagram illustrating clustering steps where the cluster capacity is equal to 50 units, in accordance with embodiments of the present invention.

AmorFi clusters (groups) RRHs are shown in system 600 (FIG. 6), where vertex numbers represent unicast traffic demand, starting with the root (vertex A) and proceeding to subsequent levels. However, a BFS ordering does not ensure that RRHs in the same level are connected (for contiguous clustering purposes). Hence, when AmorFi encounters an RRH that is not connected to the current cluster, it skips the RRH and moves to the next RRH (that is connected) in the ordering, either in the same level if available or next level otherwise. The current cluster terminates when the next vertex's (RRH's) demand uses up the capacity—as seen in step 1 where the cluster starts with vertex A (20 units) and ends with vertex B (30 units) when 50 units are filled up.

When it is not possible to add the vertex to the current cluster and completely cover its demand, AmorFi covers the vertex partially (i.e., satisfying a portion of its demand). This is exemplified in step 2 where the cluster starts with vertex C (30 units), continues with covering vertex D (10 units) and ends with partially covering vertex E for 10 units of traffic. Next, a new cluster is started from an un-clustered RRH at the current level that has the lowest degree. The process continues until all RRHs are completely covered. It is possible for the traffic demand at an RRH to be covered/served by multiple clusters (APs), as seen for vertex E. This happens when the demand at the RRH is partially covered by a first cluster. The RRH remains un-clustered, with its remaining demand being covered later by other cluster(s). The BFS structure creation and traversal for clustering incurs a time complexity of $O(|\mathbb{R}|^2)$.

It is possible for a cluster's capacity to be under-utilized at the edges of the network when no additional connected RRHs are available to use up the remaining cluster capacity. This could contribute to more APs (than an optimal scheme) being required to support a traffic satisfaction of $\lambda$ in the network. However, by intelligently using a combination of both breadth-first and depth-first searches (on the BFS ordering) to maintain RRH contiguity in clusters, as well as initializing a new cluster with a low degree RRH, helps AmorFi keep this sub-optimality low. The evaluations/results reveal that compared to a lower-bound scheme, where number of APs m* required to support $\lambda$ is calculated without the contiguity requirement:

$$\left(m^* = \left\lceil \frac{|A|P}{\sum_r T_r} \right\rceil\right)$$

AmorFi incurs only x % additional APs. Further, in a cluster, where there is remaining capacity, the remaining capacity is distributed among its member RRHs to increase the traffic satisfaction of that cluster. Hence, $$\lambda_i^r \geq \lambda_i, \forall r.$$

The traffic demand delivered at each RRH $\lambda_i^r$ from the clustering process is feasible, only if there exists a channel assignment such that interfering clusters are not assigned the same channel. As the clusters are formed in the clustering step, AmorFi maintains a cluster graph (i.e., graph with clusters as vertices) along with its adjacency matrix $C_{uv}$. $C_{uv}=1$ if (a) Cluster u and Cluster v serve the traffic of a common RRH or (b) If one or more RRHs that are part of Cluster u, are in the interference range of one or more of the RRHs from Cluster v. As the vertices are added to the cluster graph (as and when clusters are formed), AmorFi keeps track of the largest clique in the cluster graph. Note that finding the largest clique in a given graph (i.e., not constructed from scratch) is a challenging task.

AmorFi employs the DSATUR coloring algorithm for assigning channels on the cluster graph. The DSATUR algorithm is based on the concept of saturation degree of the vertex, defined as the number of differently colored vertices that are neighbors to the vertex in consideration. The colors used by all the neighboring vertices form a set of colors that are non-admissible for the vertex in question. The general idea is to select the vertex (i.e., cluster) with the highest saturation degree and assign to it the least admissible color. Overall time complexity is $O(|\mathbb{R}|^2)$.

If the clique number of the cluster graph is greater than the number of colors (channels, $|\mathbb{K}|$), one or more adjacent vertices (clusters) are assigned the same color, decreasing the corresponding cluster's $\lambda_i^r$. The number of orthogonal channels in 5 GHz (nine) is larger than typical clique sizes observed in the cluster graphs (two to six). Hence, while AmorFi can eliminate the reduction in $\lambda_r$ in 5 GHz, this may not be possible in 2.4 GHz, where there are only three channels. In this case, the coloring algorithm assigns the same channel to one or more adjacent clusters (say n) in a clique with size more than three, thereby reducing the per-cluster channel capacity for these clusters by a factor of 1/n. Correspondingly, the $\lambda_i^r$ (from the clustering step) of all the RRHs in these adjacent clusters that shared the same channel is scaled by 1/n. The minimum traffic satisfied across all the RRHs at the end of the feasible channel assignment step is given by:

$$\hat{\lambda}_i = \min_r(\lambda_i^r).$$

In the above algorithm, as $\lambda_i$ is decremented in each iteration, fewer APs would be required to satisfy it. This is because, with lesser traffic demand, the size of each cluster would increase as more RRHs can be served by a single AP. Ideally, to maximize $\lambda$, it would be sufficient to stop at an iteration, when the number of APs required just satisfies the available number of APs (input). However, the channel assignment process disrupts this monotonic trend. While utilizing all available APs delivers the maximum traffic demand $\lambda_i$, it also increases the number of clusters and potentially the clique number, consequently incurring a bigger reduction to A during channel assignment (resulting in a final lower $\hat{\lambda}_i$). Thus, it is useful to search over the entire space of $\lambda$ (100 iterations with $\delta$=0.01) to evaluate the relative impact of both the steps (clustering and channel assignment) and identify the best network configuration.

A common characteristic of high-density venues is the co-existence of unicast (e.g., web browsing) and broadcast (e.g., video of sports highlights) applications. The key challenge in addressing such heterogeneous traffic demands is to account for their contrasting nature. If a user browses the web (unicast traffic), the user would increase the traffic demand at the RRH. However, if the user subscribes to an already broadcasting video stream, the user would have no impact on the traffic demand at the RRH. Optimizing for the unicast traffic requires an increase in capacity at the RRH, favoring configurations with small clusters that enable higher spatial reuse in the network. On the other hand, optimizing for broadcast traffic requires expanding the coverage of already available capacity to include multiple RRHs, thereby favoring configurations with large clusters.

One way to address this is to optimize for unicast and broadcast traffic separately, e.g., by treating them as two individual problems. This would yield a solution where the APs would exclusively serve either unicast or broadcast traffic. In practice, a user requesting a broadcast stream while browsing the web would have to be connected to two different APs (channels), which is impractical or suffer from poor performance in one of the applications. Thus, the key challenge is to identify a common network configuration that optimizes both the broadcast and unicast traffic jointly.

Given a separate traffic demand for unicast $(T_{r,u})$ and broadcast $(T_{r,b})$ traffic at an RRH, the ONC problem formulation remains the same except for the constraint on the unicast traffic satisfaction, which would get replaced by the following two constraints for unicast and broadcast, respectively.

$$\lambda_{r,b} = \min\left\{1, \sum_{i \in S(r)} \sum_{k=1}^{|K|} X_{ik} \gamma_i P\right\} \geq \lambda, \forall r \in \mathbb{R} \quad (1a)$$

$$\lambda_{r,u} = \min\left\{1, \sum_{i \in S(r)} \sum_{k=1}^{|K|} \frac{X_{ik}(1-\gamma_i)P}{\sum_{l \in R(i)} T_l}\right\} \geq \lambda, \forall r \in \mathbb{R} \quad (1b)$$

Here, the same fraction of traffic satisfaction for both broadcast $(\lambda_{r,b})$ and unicast $(\lambda_{r,b})$ traffic at an RRH is desired. $\gamma_i$ is the output parameter that determines the amount of cluster (AP) capacity that is split between broadcast and unicast demands, and is responsible for the coupling between the heterogeneous demands.

Interestingly, the example algorithms are inherently equipped to address unicast and broadcast demand jointly, requiring only a minor tweak to the clustering procedure. Recall that AmorFi transforms the k-maximization problem to an iterative minimization of the number of APs required to realize a given k. Hence, at each iteration, it increases the size (coverage) of the clusters (APs) as much as possible, so as to minimize the number of APs employed. This transformed optimization lends itself to optimizing for broadcast traffic. Note that the most efficient use of a cluster's (AP's) capacity (say p) is to leverage the broadcast advantage and serve an equivalent amount (p) of broadcast traffic demand from as many RRHs as possible. Hence, given separate traffic demands for unicast ($T_{r,u}$) and broadcast ($T_{r,b}$) at an RRH and $\lambda_i$, AmorFi satisfies the broadcast demand ($\lambda_i T_{r,b}$) first, before satisfying the unicast demand ($\lambda_i T_{r,u}$) at the RRH. This allows AmorFi to leverage the broadcast traffic that is already served by the cluster to also satisfy (completely or partially) the broadcast demand at the new unclustered RRH being considered, thereby utilizing the cluster's remaining capacity to accommodate additional unicast/broadcast traffic. In other words, whenever a new RRH, r, is added to a cluster c, only its additional broadcast demand (if positive) not satisfied by the cluster's existing broadcast traffic, i.e., $\lambda_i \cdot (T_{r,b} - \max_{r \in R(c)} \{T_{r,b}\})$, would eat into the cluster's remaining capacity as new traffic demand. Following this, the broadcast traffic satisfied by the cluster would increase to $\lambda_i T_{r,b}$. The unicast traffic demand at the RRH is then handled as before.

Figure 7:
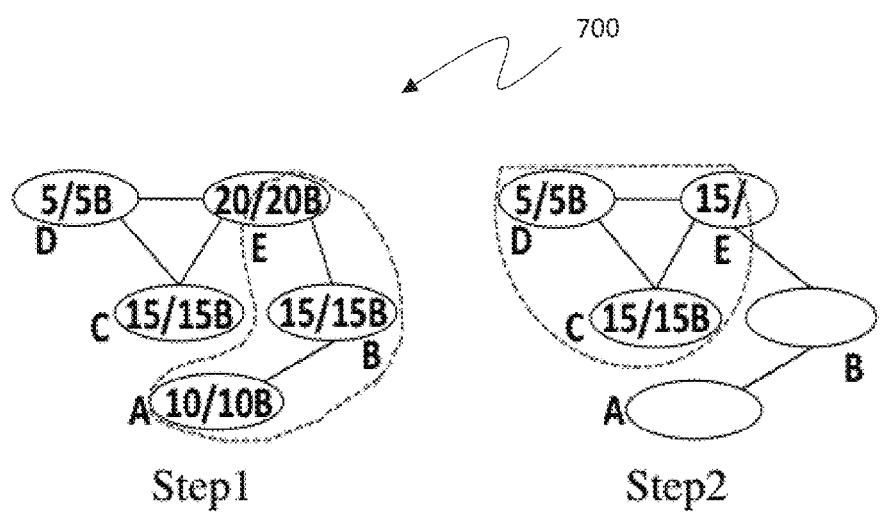
FIG. 7 is a block/flow diagram illustrating clustering steps where 50% of the total demand at each RRH (remote radio head) is broadcast, in accordance with embodiments of the present invention.

FIG. 7 illustrates an example 700 where 50% of the total demand at each RRH is broadcast (B). The procedure starts at the root node (A) and cluster capacity is 50 units as before (step 1). When adding vertex B to the cluster, the additional load from broadcast traffic is only 5 units since the cluster already serves 10 units of broadcast from vertex A. With vertices A and B in the cluster, they use 25 units of the capacity for unicast and 15 units for broadcast for a total of 40 units (leaving room for 10 units). Next, the cluster exhausts its capacity by completely covering the broadcast demand of vertex E (for additional 20−15=5 units) and partially covering the unicast demand for 5 units. In step 2, the new cluster initiates from vertex C using up 30 units (15 unicast and 15 broadcast). When adding vertex D, the 5 units of broadcast demand comes for free since the cluster already covers 15 units of broadcast. The additional 5 units of unicast traffic from vertex D increases the used capacity to 35 units. Finally, the procedure terminates by covering vertex E's remaining unicast demand for 15 units.

AmorFi's transformed optimization helps determine efficient network configurations that strike a good balance between the coverage benefits of large clusters for broadcast and the reuse benefits of small clusters for unicast. If the traffic demand is heavily biased towards a particular traffic type, AmorFi automatically tailors the configurations to favor the dominant traffic. Further, AmorFi's approach of delivering a given traffic demand using a smaller number of radios also makes it energy-efficient.

Figure 8:
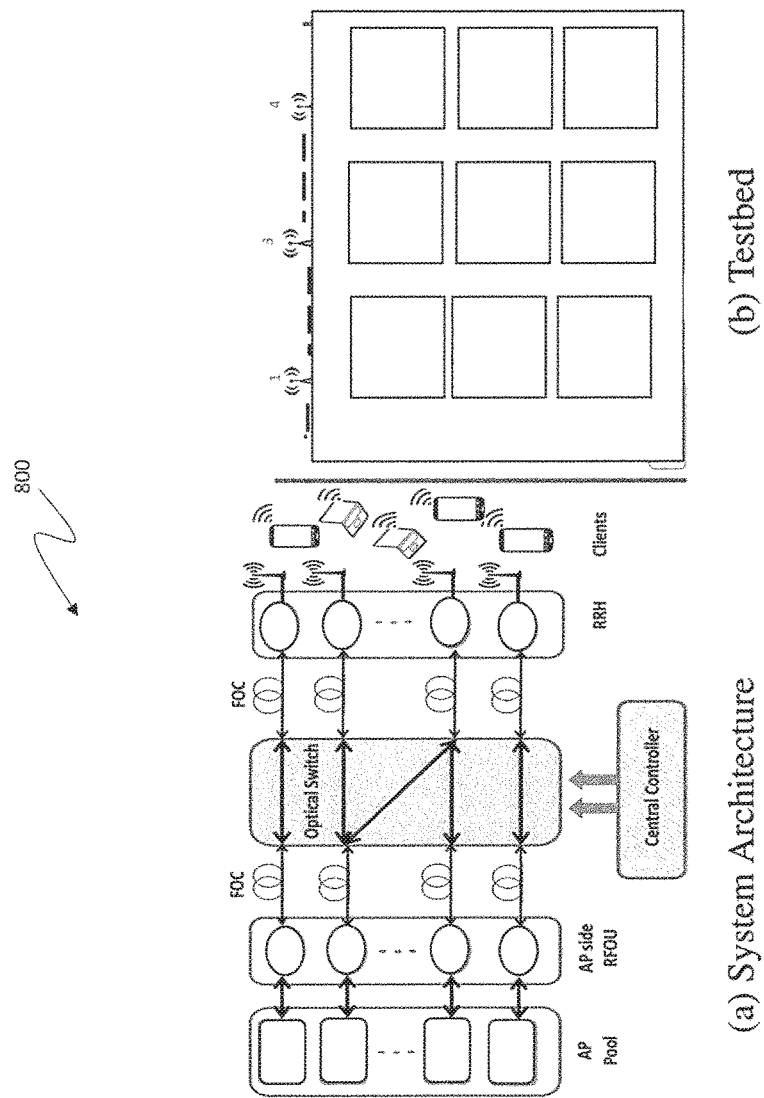
FIG. 8 is a block/flow diagram illustrating the C-RAN-based WLAN architecture, in accordance with embodiments of the present invention.

The C-RAN-based WLAN architecture 800 is shown in FIG. 8a. The APs can be laptops equipped with dual-band 802.11a/b/g/n Wi-Fi adapters. The main intelligence of AmorFi resides in the central controller, which is a PC with Ubuntu 14.04 OS responsible to collect AP reports and execute AmorFi's algorithms. It then instructs the APs to apply the channel assignment decisions and configures the switching unit to effect the AP-RRH mappings. In the example implementation, the mappings are realized in the optical domain where a programmable switching unit (i.e., an optical splitter) maps each AP to zero or more RRHs, allowing a mix of one-to-one and one-to-many configurations. The RF-to-optical units (RFOUs) are transceivers that convert the RF signal to optical for the downlink, and vice-versa for the uplink. The external antenna of the AP is removed and attached to the RFOU to provide the RF source at the AP side. On the RRH side, RFOUs transmit/receive RF signals providing wireless access to clients. The RRHs in the testbed can currently be fitted with only one RF antenna, restricting the system to use only SISO (single input single output) transmissions. However, a proof-of-concept MIMO (multiple input multiple output) deployment with multi-antenna RRHs has been achieved.

The front-haul is based on Radio-over-fiber (RoF), where an optical signal is modulated based on the input radio signal, and transmitted over Fiber Optic Cable (FOC). Optical multiplexing helps carry multiple optical signals (corresponding to multiple RF signals) on the same fiber, allowing RRHs to provide simultaneous service from multiple APs (on different Wi-Fi channels). With FOC latency around 4 μsec/Km, RoF retains the signal synchronization across RRHs, as well as the timing constrains between uplink and downlink signals. The RoF latency when compared to the minimum DIFS (DCF (distributed coordination function) Interframe Space)) duration in 802.11 (34 μsec, and 50 μsec in 5 GHz, and 2.4 GHz band, respectively) is almost negligible, allowing APs to carrier sense at the RRHs without any significant delay. Apart from RoF being simple to realize, the signal attenuation is also not appreciable over long distances when deployed in large venues. FIG. 8b shows the layout of the testbed deployed in an indoor office environment. In one example, four APs and four RRHs are illustrated due to limited number of ports on the optical switch.

AmorFi's performance and adaptability in a network with only unicast traffic is evaluated. Later, it is extended to include both unicast and broadcast traffic.

Figure 9:
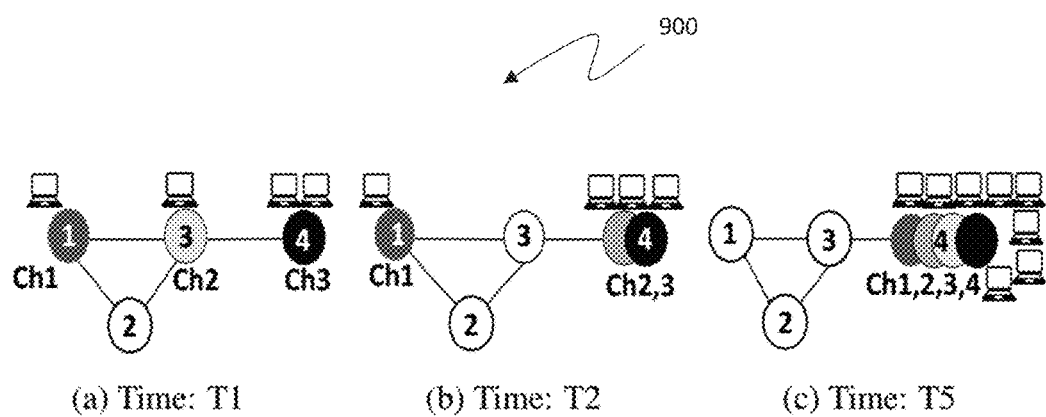
FIG. 9 is a block/flow diagram illustrating handling of traffic surge, in accordance with embodiments of the present invention.

The RRHs have interference relationships 900 as in FIG. 9, where an edge indicates that the two RRHs overhear each other. AmorFi is compared against two other baselines: (a) Traditional WLAN, with no load balancing (Tr_no_LB)—agnostic to AP load, where the clients associate to the AP with the strongest signal and (b) Traditional WLAN with load balancing (Tr_LB)—distributes the clients evenly among all APs that can potentially serve the clients (possibly with weaker signal), where the goal is to avoid unfair load distribution among APs. These baselines are realized by static one-to-one configuration between the APs and RRHs (AP1 to RRH1, AP2 to RRH2 and so on). The experiments are conducted without external interference in the 5 GHz band where AP channel bandwidth is 20 MHz. Each AP is assigned an orthogonal channel. These channels are represented as Ch1, Ch2, Ch3, and Ch4.

The example embodiments used iperf to measure the maximum per-AP throughput for UDP and TCP to be ~58 Mbps and ~49 Mbps, respectively with 64-QAM (one spatial stream, 800 ns. guard interval and 65 Mbps bit rate). The total UDP and TCP capacity with four APs is thus ~232 Mbps and ~198 Mbps, respectively. The example embodiments used eight clients and set the traffic demand of each client to $$\frac{Network capacity}{8},$$

meaning that an AP can only satisfy the traffic demands of two clients.

Scenario I: Handling Traffic Surge: A first test is of the case when traffic demand increases due to new clients joining the network over five time intervals (T1 to T5), each lasting 20 seconds. The initial AmorFi mapping (prior to T1) is similar to the baselines where each AP is mapped to a separate RRH. FIG. 9 shows how this configuration evolves to accommodate the changing user population at the end of a subset of intervals. Each AP is represented by a gray-shade and each RRH takes the channel(s) of the AP(s) that it is mapped to (e.g., RRH 4 is mapped to two APs on channels 2 and 3 after T2). RRH nodes with no channel indicate that no AP is mapped to them (e.g., RRHs 1, 2 and 3 after T5).

With load balancing, the user avoids overloading AP4 by connecting to AP3 (via RRH3) at the expense of reduced throughput due to lower SNR (signal to noise ratio). AmorFi on the other hand, sensing the shift in traffic demand, re-maps AP3 (from RRH3) to RRH4 (FIG. 9b). This allows the new user to be served by AP3 (avoiding overload) without sacrificing SNR since AP3 is mapped to RRH4 near the user. In subsequent intervals (T3, T4), as new clients join the network, the baseline schemes progressively have reduced traffic satisfaction with load balancing being slightly better (66% vs 61%). AmorFi continues its 100% traffic satisfaction by adapting the front-haul configuration (not illustrated in FIG. 9). The final time interval T5 shows the case when all eight users congregate at RRH4. AmorFi maps all four APs to RRH4 (FIG. 9c), distributing the clients evenly and utilizing the entire network capacity. This helps AmorFi to completely satisfy the demand while the baseline schemes' traffic satisfaction drops to 38% (with load balancing) and 25% (without load balancing). The higher traffic satisfaction ratios with AmorFi reflect on the aggregate TCP throughput numbers delivering more than twice the throughput of baseline schemes.

Figure 10:
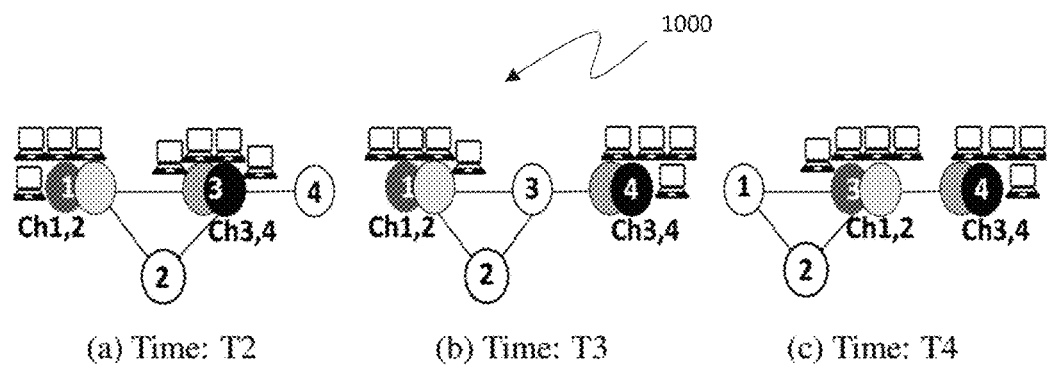
FIG. 10 is a block/flow diagram illustrating handling of traffic migration, in accordance with embodiments of the present invention.

Scenario II: Handling Traffic Migration: Next, a test for the case where the traffic demand stays the same (e.g., no users joining/leaving) is presented, but shifts across the network due to user mobility. The configurations of AmorFi and the comparisons with baseline schemes are in the configuration 1000 of FIG. 10. During T1, the process starts with eight users concentrated at RRH1 and AmorFi mapping all four APs to RRH1. During T2 through T4, users move (in groups of four) towards RRH4 as seen in FIG. 10. Finally, during T5, all eight users end up at RRH4. The two baseline schemes achieve traffic satisfaction of only 60% and 51% in the best case (e.g., four users at an RRH at T2), and 36%, and 25% in the worst case (e.g., eight users at one RRH at T1 and T5). Meanwhile, AmorFi offers 100% traffic satisfaction by distributing the demand evenly between the APs, which also increases the aggregate network throughput.

Scenario III: Unicast and Broadcast traffic: Broadcasting videos over Wi-Fi is becoming increasingly popular in high-density venues. Accommodating such high-bandwidth broadcast applications is challenging since any increase in the unicast traffic demand invariably affects the quality of the broadcast video. An experiment is conducted where the video quality of the broadcast videos is measured while varying the background (unicast) traffic.

Figure 11:
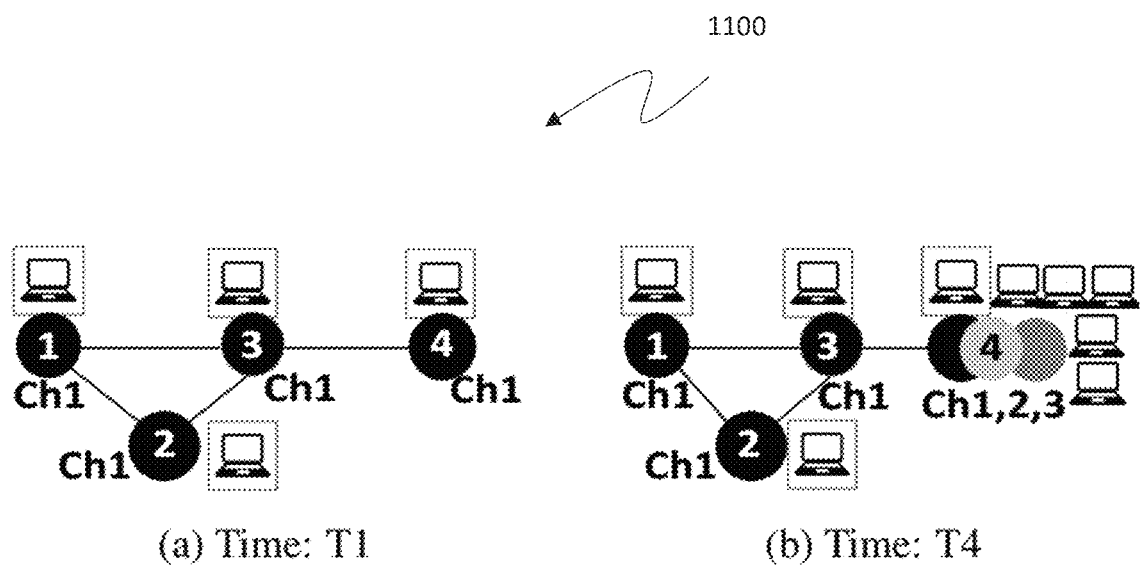
FIG. 11 is a block/flow diagram illustrating unicast and broadcast traffic, in accordance with embodiments of the present invention.

The experiment spans four one minute long time intervals (T1-T4). The configuration 1100 of FIG. 11 shows the initial user distribution during T1. All users requesting broadcast traffic at each RRH, are collectively represented by one user with a box around it. To serve the broadcast demand, the baseline schemes require all four APs (and four channels) to broadcast the videos at cell level. On the other hand, network-wide broadcast capability with AmorFi requires only one AP (and one channel) mapped to all four RRHs to deliver broadcast videos to all subscribers (see FIG. 11a). Starting with T2, unicast users (each with traffic demand of 20 Mbps) gradually join the network at RRH4. As the unicast traffic demand increases, video quality with baseline schemes suffer. On the other hand, AmorFi maps additional APs (on channels 2 and 3) to RRH4 and enables them to serve the unicast users, while allowing the AP on channel 1 to continue serving the broadcast traffic over four RRHs. With five unicast clients, AmorFi manages a PSNR of ~30 db, while the baseline schemes support ~15 db (without load balancing) and ~18 db (with load balancing), respectively.

In conclusion, AmorFi is a radically new way of deploying WLANs to handle peak traffic demands with average-case provisioning. The key idea is to decouple baseband processing from RF transmission (inspired by the centralized-RAN concept in cellular networks) and introduce software programmability to flexibly allocate Wi-Fi capacity in real time based on varying traffic demands. AmorFi is implemented by using off-the-shelf Wi-Fi APs over a RF-over-fiber centralized-RAN testbed. Experiments and simulations demonstrate that the software-defined capacity allocation enabled with AmorFi significantly improves throughput compared to traditional Wi-Fi deployments and efficiently supports a mix of unicast and broadcast applications.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for dynamic provisioning of Wi-Fi capacity in areas using a centralized radio access network (C-RAN), the method comprising:
   introducing a set of access points (APs) in the C-RAN for providing capacity required to serve a plurality of users accessing heterogeneous content;
   introducing a set of remote radio heads (RRHs) in the C-RAN acting as transmit/receive points, the set of APs being mapped to at least one of the set of RRHs to create AP-RRH mappings;
   tracking traffic fluctuations of the plurality of users in the C-RAN; and
   based on the traffic fluctuations, adapting the AP-RRH mappings at a granularity of epochs, where measurements from previous epochs serve as input to drive current epochs.

2. The method of claim 1, wherein the set of APs is adapted to serve user traffic demands in terms of capacity and requests for accessing the heterogeneous content.

3. The method of claim 2, wherein the set of APs is optimized to serve users of the plurality of users requesting the heterogeneous content.

4. The method of claim 1, wherein the C-RAN is a distributed antenna system (DAS).

5. The method of claim 1, wherein each RRH of the set of RRHs requires a traffic demand for a current epoch based on weighted average of demands from the previous epochs.

6. The method of claim 5, wherein the traffic demand is an estimate of aggregate throughput requirements of one or more users of the plurality of users accessing the C-RAN through a RRH of the set of RRHs.

7. The method of claim 1, wherein the heterogeneous content includes unicast content and broadcast content.

8. The method of claim 1, wherein clusters of RRHs are formed such that a number of RRH clusters does not exceed a number of APs.

9. The method of claim 8, wherein each of the RRH clusters sharing a common RRH are assigned different channels and wherein each of the RRH clusters positioned in an interference range of each other are not assigned a same channel.

10. A system for dynamic provisioning of Wi-Fi capacity in areas using a centralized radio access network (C-RAN), the system comprising:
a memory; and
a processor in communication with the memory, wherein the processor is configured to:
introduce a set of access points (APs) in the C-RAN for providing capacity required to serve a plurality of users accessing heterogeneous content;
introduce a set of remote radio heads (RRHs) in the C-RAN acting as transmit/receive points, the set of APs being mapped to at least one of the set of RRHs to create AP-RRH mappings;
track traffic fluctuations of the plurality of users in the C-RAN; and
based on the traffic fluctuations, adapt the AP-RRH mappings at a granularity of epochs, where measurements from previous epochs serve as input to drive current epochs.

11. The system of claim 10, wherein the set of APs is adapted to serve user traffic demands in terms of capacity and requests for accessing the heterogeneous content.

12. The system of claim 11, wherein the set of APs is optimized to serve users of the plurality of users requesting the heterogeneous content.

13. The system of claim 10, wherein the C-RAN is a distributed antenna system (DAS).

14. The system of claim 10, wherein each RRH of the set of RRHs requires a traffic demand for a current epoch based on weighted average of demands from the previous epochs.

15. The system of claim 14, wherein the traffic demand is an estimate of aggregate throughput requirements of one or more users of the plurality of users accessing the C-RAN through a RRH of the set of RRHs.

16. The system of claim 10, wherein the heterogeneous content includes unicast content and broadcast content.

17. The system of claim 10, wherein clusters of RRHs are formed such that a number of RRH clusters does not exceed a number of APs.

18. The system of claim 17, wherein each of the RRH clusters sharing a common RRH are assigned different channels and wherein each of the RRH clusters positioned in an interference range of each other are not assigned a same channel.

19. A non-transitory computer-readable storage medium comprising a computer-readable program for dynamic provisioning of Wi-Fi capacity in areas using a centralized radio access network (C-RAN), wherein the computer-readable program when executed on a computer causes the computer to perform the steps of:
introducing a set of access points (APs) in the C-RAN for providing capacity required to serve a plurality of users accessing heterogeneous content;
introducing a set of remote radio heads (RRHs) in the C-RAN acting as transmit/receive points, the set of APs being mapped to at least one of the set of RRHs to create AP-RRH mappings;
tracking traffic fluctuations of the plurality of users in the C-RAN; and
based on the traffic fluctuations, adapting the AP-RRH mappings at a granularity of epochs, where measurements from previous epochs serve as input to drive current epochs.

20. The non-transitory computer-readable storage medium of claim 19,
wherein the set of APs is adapted to serve user traffic demands in terms of capacity and requests for accessing the heterogeneous content; and
wherein the set of APs is optimized to serve users of the plurality of users requesting the heterogeneous content.

* * * * *